US011535534B2

(12) United States Patent
LaSee

(10) Patent No.: US 11,535,534 B2
(45) Date of Patent: Dec. 27, 2022

(54) WATER PURIFICATION SYSTEM WITH CYCLING SACRIFICIAL ANODE

(71) Applicant: Jack LaSee, Abbottsford, WI (US)

(72) Inventor: Jack LaSee, Abbottsford, WI (US)

(*) Notice: Subject to any disclaimer, the term of this patent is extended or adjusted under 35 U.S.C. 154(b) by 364 days.

(21) Appl. No.: 16/838,124

(22) Filed: Apr. 2, 2020

(65) Prior Publication Data

US 2020/0325042 A1    Oct. 15, 2020

Related U.S. Application Data

(60) Provisional application No. 62/833,852, filed on Apr. 15, 2019.

(51) Int. Cl.
*C02F 1/461* (2006.01)
*C02F 1/46* (2006.01)

(52) U.S. Cl.
CPC ........ *C02F 1/46109* (2013.01); *C02F 1/4606* (2013.01); *C02F 2001/46119* (2013.01); *C02F 2001/46123* (2013.01); *C02F 2001/46171* (2013.01); *C02F 2201/4616* (2013.01); *C02F 2303/04* (2013.01)

(58) Field of Classification Search
None
See application file for complete search history.

(56) References Cited

U.S. PATENT DOCUMENTS

| | | |
|---|---|---|
| 2006/0169595 A1 | 8/2006 | Schlager |
| 2006/0180463 A1 | 8/2006 | Schlager et al. |
| 2011/0079510 A1 | 4/2011 | Tretheway et al. |
| 2011/0079520 A1 | 4/2011 | Tretheway et al. |
| 2011/0108438 A1 | 5/2011 | Tretheway et al. |
| 2018/0065867 A1 | 3/2018 | Hale et al. |
| 2018/0230025 A1* | 8/2018 | Tsantrizos ........... C02F 1/46109 |

FOREIGN PATENT DOCUMENTS

| | | | | |
|---|---|---|---|---|
| CN | 109179595 A | * | 1/2019 | .......... C02F 1/46104 |
| WO | WO-2020044265 A1 | * | 3/2020 | ................ C02F 1/36 |

OTHER PUBLICATIONS

English translation of Permentier et al. WO 2020/044265 A1 (Year: 2020).*
English translation of Zhang et al. CN 109179595 A (Year: 2019).*

* cited by examiner

*Primary Examiner* — Wojciech Haske
(74) *Attorney, Agent, or Firm* — Boyle Fredrickson, S.C.

(57) ABSTRACT

An electrolysis system for water cleaning employs close anode and cathode plate spacing while providing cleaning of the plates. In one embodiment a moving anode allows access to the plates for cleaning.

5 Claims, 8 Drawing Sheets

WATER PURIFICATION SYSTEM WITH CYCLING SACRIFICIAL ANODE

CROSS REFERENCE TO RELATED APPLICATION

This application claims the benefit of U.S. provisional application 62/833,852 filed Apr. 15, 2019 and hereby incorporated by reference in its entirety.

STATEMENT REGARDING FEDERALLY SPONSORED RESEARCH OR DEVELOPMENT

--

BACKGROUND OF THE INVENTION

The present invention relates generally to water purification systems and in particular to an improved anode design for purifying water.

Water purification systems are used, for example, in factories or municipal water treatment facilities or the like where the goals of water conservation dictate the reuse of water which must be disinfected or otherwise purified.

The point source treatment of water through the addition of disinfecting chemicals such as chlorine or bromine is well known. These materials may be purchased in bulk and dispensed into the water stream or may be generated on site, for example, by the electrolysis of salt solutions. In some applications, for example, in chillier water used in cheese or meat processing, the addition of these chemicals is disfavored because of concerns about the generation of an off-taste in the product and chemical byproducts that may adversely affect the product or the environment.

Ultraviolet light is often used for point source water purification or disinfection. In such systems, the high-energy light causes a breakdown in cellular components of microorganisms in the treated water. A significant drawback to ultraviolet systems is their inability to work in turbid liquids or those with a significant organic component.

It also is known to use electrolysis systems for direct treatment of the waste stream. One possible advantage to this direct treatment is that it exposes the waste stream to electrolysis products which have extremely short lifetimes but that are nevertheless very effective for disinfection. Generally, such electrolysis systems may desirably have small gaps between the electrodes; however, it is difficult to maintain a small gap spacing because of the accumulation of contamination on the electrode surfaces and constant erosion of the anode.

SUMMARY OF THE INVENTION

The present invention provides an electrolysis system with anode and cathode plates that constantly move with respect to each other. This allows close spacing of the cathode and anode while constantly exposing different portions of the anode away from the cathode for cleaning or other anti-fouling procedures.

In one embodiment erosion of the anode is accommodated by providing a frustoconical interface surface where erosion can be compensated for by axial movement of the anode.

In one embodiment the electrolysis system employs stationary plates cleaned with a movable strip or string.

Specifically, then, the present invention in one embodiment provides a water treating apparatus having a cathodic electrode providing a first exposed electrode face and an anodic electrode providing a second exposed electrode face, the second exposed electrode face presenting a portion proximate to the first exposed electrode face across a gap. A water conduit is provided introducing water to be treated into the gap, and the anodic electrode and cathodic electrode are mounted to move continuously with respect to each other to change the portion of the second exposed electrode face proximate to the first exposed electrode face.

It is thus a feature of at least one embodiment of the invention to provide a water treatment electrode system that presents the surface of the anodic electrode for cleaning and inspection on a continuous basis.

The water treatment apparatus may further include a scrubbing surface positioned outside of the gap to mechanically scrub the exposed second electrode face as it passes the scrubbing surface.

It is thus a feature of at least one embodiment of the invention to permit continuous cleaning of the anode surface unencumbered by the close spacing of the cathode.

The scrubbing surface may be affixed to the cathode.

It is thus a feature of at least one embodiment of the invention to provide a simple cleaning system fixed on the cathode taking advantage of the motion of the anode.

Alternatively, the scrubbing surface may move with respect to cathodic electrode and anodic electrode.

It is thus a feature of at least one embodiment of the invention to provide a more effective scrubbing action that can move, for example, faster or in a different direction than movement of the cathode.

In one embodiment the movement of the scrubbing surface may be in rotation.

It is thus a feature of at least one embodiment of the invention to make use of a highly efficient rotating brush scrubbing surface.

The first exposed electrode face and a portion of the second exposed electrode face may be portions of a cylinder.

It is thus a feature of at least one embodiment of the invention to provide a simple method of exposing the anode for inspection and cleaning without deactivating the water treatment process. The use of a cylinder allows a new anode surface to replace the anode surface removed from the gap on a continuous basis.

The portions of the cylinder of the first exposed electrode face and the second portion of the second exposed electrode face may be coaxial.

It is thus a feature of at least one embodiment of the invention to provide for a simple mechanical mechanism for moving the anode by simply rotating the anode about an axis coaxial with the cathode.

In one embodiment, the cathodic electrode may present a frustoconical first exposed electrode surface, and the portion of the second exposed electrode surface anodic electrode may present a frustoconical surface coaxially positioned within the first exposed electrode surface. In this case the anodic element may be mounted to move axially with erosion of the anodic cathode to maintain a predetermined separation of the gap.

It is another feature of at least one embodiment of the invention to provide a system that allows substantially complete exhaustion of the anode material rather than repeated replacement of partially consumed anodes.

The frustoconical surface of the second exposed electrode surface may be at a proximal end of the anodic electrode, and a distal end of the anodic electrode may provide for receipt of a splice connection to a second anodic electrode to allow continuous presentation of a new anode surface with erosion of the anodic electrode across the gap.

It is thus a feature of at least one embodiment of the invention to provide a water treatment system that can simply accommodate erosion of the anode treatment without the need to stop the treatment process.

In one embodiment, the water treating apparatus may include a cathodic electrode providing a first planar exposed electrode face and an anodic electrode providing a second planar exposed electrode face, the second exposed electrode face presenting a portion proximate to the first exposed electrode face across a gap. Again, a water conduit may introduce water to be treated into the gap. A cleaning strip movable along a strip axis within the gap may provide a mechanical abrasion between the cleaning strip and at least one of the first planar exposed electrode face and second planar exposed electrode face with movement of the cleaning strip along the strip axis. In addition, cleaning strip support guides may be positioned to receive the cleaning strip flanking the first and second exposed electrode faces and to move the cleaning strip perpendicularly to the strip axis to provide cleaning over an area of the first and second exposed electrode faces in the gap.

It is thus a feature of at least one embodiment of the invention to provide a similar cleaning effect of the narrow gap between the anode and cathode in stationary plate systems.

The cleaning strip maybe sized to contact both the first and second electrode exposed surfaces.

It is thus a feature of at least one embodiment of the invention to permit rapid cleaning of both the anode and cathode at one time.

The cleaning strip may provide for radially extending bristles.

It is thus a feature of at least one embodiment of the invention to make use of an efficient brush structure for cleaning the narrow gap between anode and cathode.

These particular objects and advantages may apply to only some embodiments falling within the claims and thus do not define the scope of the invention.

DETAILED DESCRIPTION OF THE PREFERRED EMBODIMENT

Figure 1:
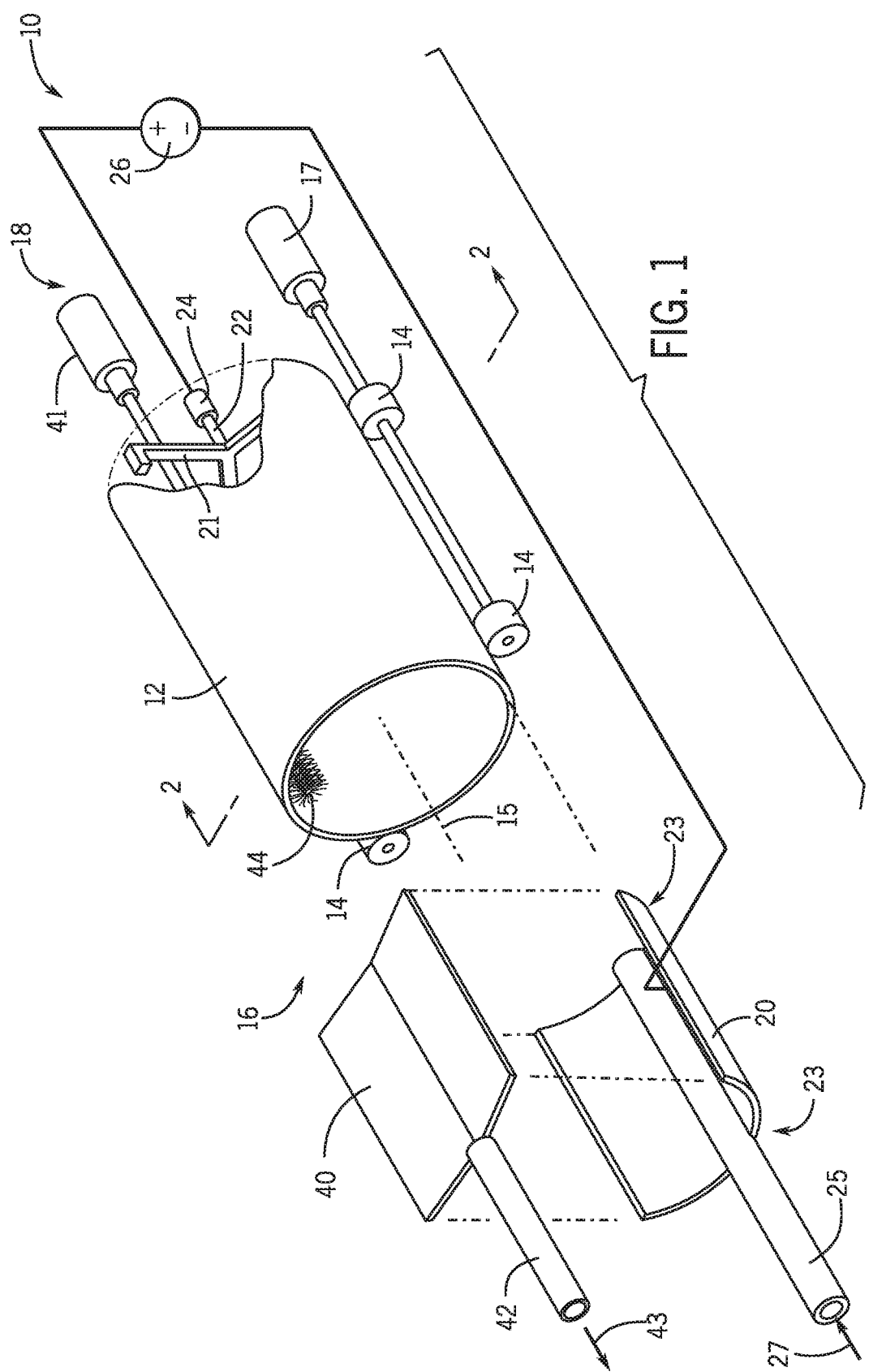
FIG. 1 is an exploded perspective view of the principal components of one embodiment of present invention including a cylindrical tubular anode, a hemi-cylindrical internal cathode, and a water harvesting plate.

Referring now to FIG. 1, water purification device 10 per the present invention may provide a tubular cylindrical anode 12 constructed of a conductive metal, for example, steel. In one embodiment the cylinder may have a length of 4 feet and a diameter of 16 inches; however, these dimensions may be scaled as desired.

The outer surface of the cylindrical anode 12 may be supported on a set of four rollers 14 having axes parallel to the horizontal axis of the cylindrical anode 12 and supporting the cylindrical anode 12 so that rotation of the rollers 14 rotates the cylindrical anode 12 about a central, horizontal longitudinal axis 15 of the cylindrical anode 12. Rollers 14 may be rotated by an electric motor 17.

A front end 16 of the cylindrical anode 12 may be open and a rear end 18 of the cylindrical anode 12 may be closed and may further connect, by means of a conductive spider 21, to a central shaft 22 aligned with longitudinal axis 15. The central shaft 22 may be conductive and may connect via a slip ring assembly 24 to a positive terminal of a direct-current power supply 26. It will be appreciated that cylindrical anode 12 may thus be connected to power supply 26 as it rotates. A power supply suitable for use with the present invention is described in US patent application 2011/0108438 hereby incorporated by reference in its entirety.

A hemicylindrical tubular cathode 20 also of a conductive metal such as steel may fit into the cylindrical anode 12 to be held by its weight and gravity closely against the inner lower surface of the cylindrical anode 12. The axes of the defining cylinders of the cathode 20 and anode 12 may be coaxial. The spacing between the cylindrical anode 12 and the hemicylindrical cathode 20 may be enforced, for example, by Teflon runners 23 following the circumferential curvature of the ends of the hemicylindrical cathode 20 separated along longitudinal axis 15. Alternatively, the spacing may be enforced by insulating wheels (for example, ceramic) mounted on the hemicylindrical cathode 20.

A typical gap 19 between the hemicylindrical cathode 20 and cylindrical anode 12 will be 0.047-0.375 inches; however, the invention contemplates a gap from five millimeters to 25 millimeters. The hemicylindrical cathode 20 may connect by a flexible conductor to the negative terminal of power supply 26.

Figure 2:
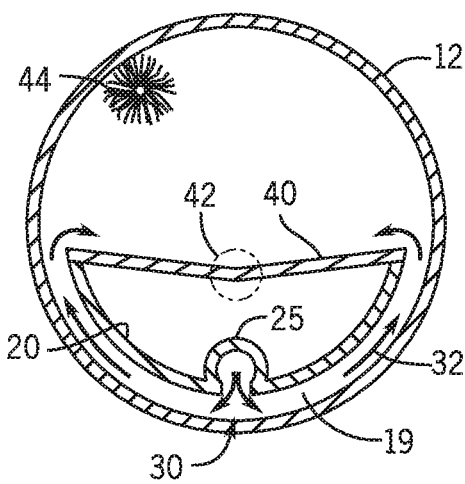
FIG. 2 is a cross-section taken along line 2-2 of FIG. 1 showing the water flow path between the cathode and anode.

Referring also to FIG. 2, a water inlet pipe 25 may provide water 27 to be treated along an upper surface of the hemicylindrical cathode 20 where it may pass by means of openings 30 through a lower surface of the inlet pipe 25 and the adjacent upward surface of the hemicylindrical cathode 20 to provide water flow 32 along the entire axial length of the hemicylindrical cathode 20 between a lower downwardly facing surface of the hemicylindrical cathode 20 and an upwardly facing inner surface of the cylindrical anode 12. This water passes between and along the hemicylindrical cathode 20 and cylindrical anode 12 within the gap 19 which provides electrolytic treatment to this water as it moves upward along the inner circumference of the cylindrical anode 12. As the water passes the boundary of the hemicylindrical cathode 20 upward it may spill out over onto a collection plate 40 spanning and connecting to the longitudinally extending, transversely opposed edges of the hemicylindrical cathode 20. The collection plate 40 may have an upwardly concave surface that slopes downward toward the front end 16 so that this collected water may be received by an outlet pipe 42 to be collected as treated water 47.

It will be appreciated that the cylindrical anode 12 constantly moves in a circle so that portions of the anode 12 may be cleaned by an anti-fouling brush 44 or the like that may scrub or otherwise mechanically clean the inner surface of the cylindrical anode 12 as driven by a motor 41, for example, in rotation, to reduce buildup thereupon.

Water leaking out from between the hemicylindrical cathode 20 and the cylindrical anode 12 along longitudinal axis 15 from the front and rear ends of the hemicylindrical cathode 20, which has not been fully treated, may be collected, for example, by a basin or the like and recycled into the inlet pipe 25. Thus, the outlet pipe 42 only receives treated water 47 that has passed along the full circumferential path between the hemicylindrical cathode 20 and the cylindrical anode 12.

Figure 3:
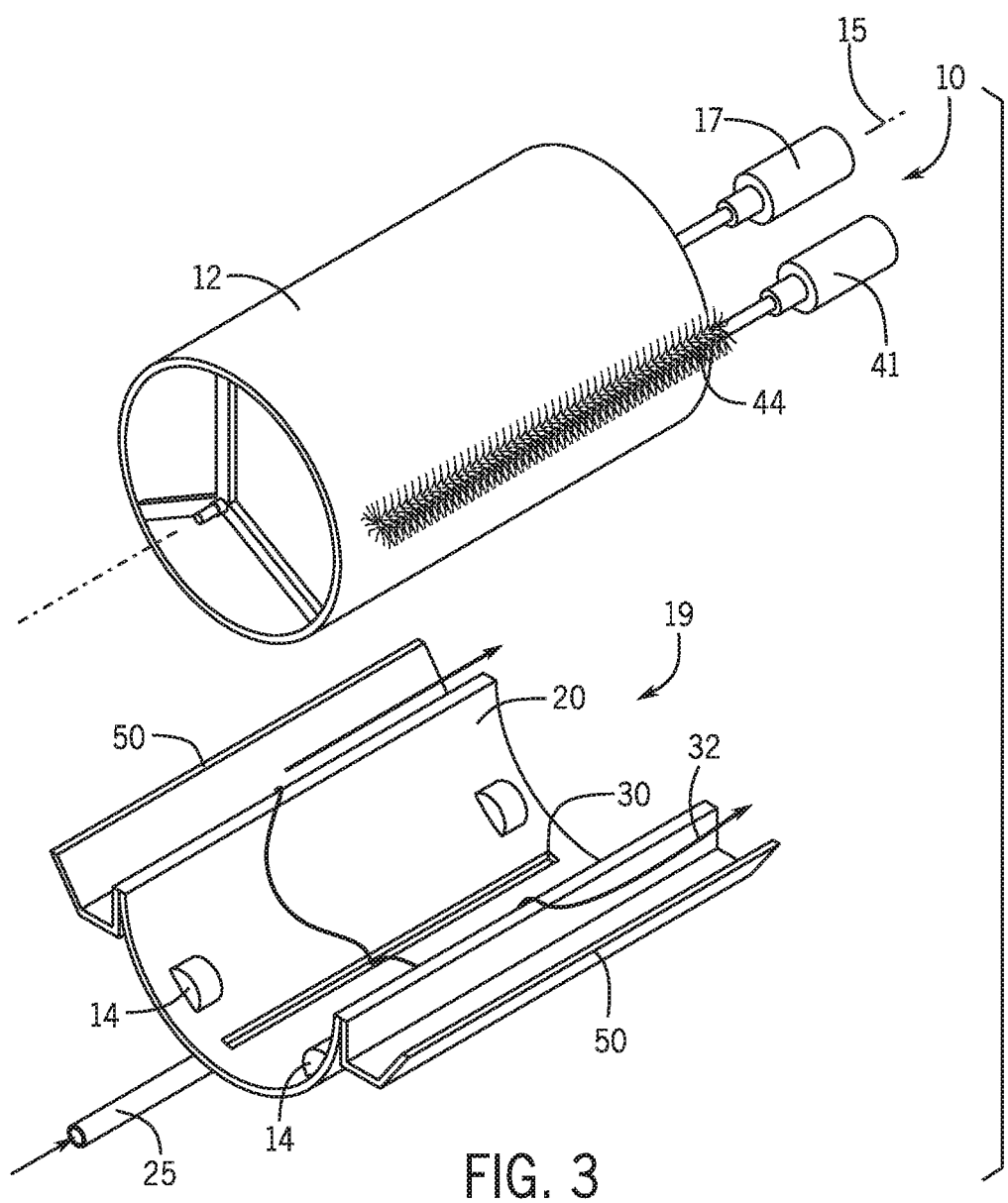
FIG. 3 is an exploded perspective view of an alternative embodiment of the invention of FIG. 1 having an external cathode.

Referring now to FIG. 3, the topology of the embodiment of FIG. 1 may be reversed with the cylindrical anode 12 fitting at its lower surface against the upper surface of a hemicylindrical cathode 20 to provide the gap 19 therebetween. In this case, the rollers 14 may be of an insulating material passing through the wall of the hemicylindrical cathode 20 to support the outer surface of the cylindrical anode 12. The ceramic rollers 14 may be lubricated with flowing water, for example, through leakage sources or pumped into the bearings to create fluid bearings. Additional guide wheels (not shown) may help further stabilize the anode 12.

As before, this support system helps ensure the maintenance of a gap 19 with erosion of the anode material, that erosion effectively moving the cylindrical anode 12 closer to the cathode 20 with the gap 19 maintained by the rollers 14. In this embodiment, the inlet pipe 25 may pass parallel to the axis 15 underneath the cylindrical cathode 20 to discharge water upwardly through a slot 30 through the hemicylindrical cathode 20. This water may flow upward along the upper surface of the hemicylindrical cathode 20 beneath the anode 12 for treatment and then be collected by side gutters 50 as indicated by water flow 32. An external brush 44 may extend parallel to axis 15 and be turned by a motor 41 to provide mechanical cleaning of the outer surface of the cylindrical anode 12 as it rotates.

Figure 4:
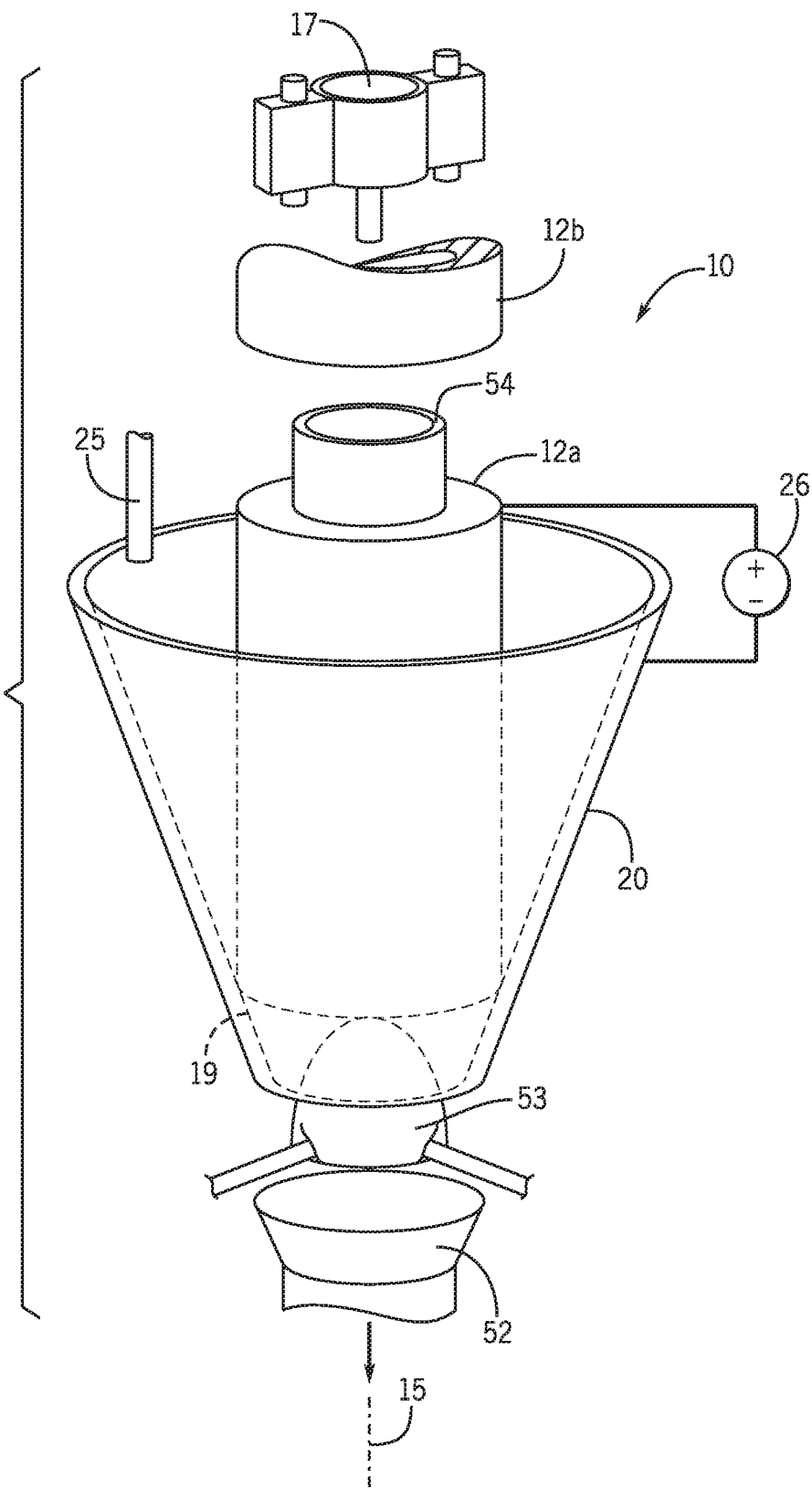
FIG. 4 is an exploded perspective view of a third embodiment of the invention providing frustoconical interface surfaces between the anode and cathode allowing gap control by axial relative movement of the same; both cathode and anode are tapered, so the gap length is determined by the angle, water flows through the tapered gap from either top or bottom, this works as shown or upside down, so heavy anode is stationary.

Referring now to FIG. 4, an alternative method of maintaining the gap 19 may make use of a frustoconical tube cathode 20 having its central axis preferably arranged to be parallel with axis 15 and vertical to receive water through inlet pipe 25. As so oriented, the upper end of the cathode 20 has the larger opening and so water from the inlet pipe 25 flows into into the volume defined by the cathode 20 and then downward therethrough and outward to a smaller opening in the tube cathode 20 to be received by a collection pipe 52. In this case, the gap 19 is formed between the inner surface of the frustoconical tube cathode 20 and a similar frustoconical outer surface at a distal end of the anode 12a, for example, having a height of approximately 11 inches to provide for a water treatment zone.

The anode 12a may be stationary in rotation with respect to the cathode 20 or may be rotated by a motor 17 to provide more even erosion of the anode 12, sharpening the frustoconical inner surface of the cathode 20 in the manner of a pencil in a pencil sharpener. Alternatively, it will be appreciated that the cathode 20 may be rotated. In this embodiment, it will be appreciated that the gap 19 may be continuously controlled by moving the anode 12a downward along axis 15 as erosion occurs, for example, through a feedback loop measuring water flow rate or electrical current rate or the like. The axial movement of the anode 12 may be, for example, by means of a track assembly and motor-driven lead screws (not shown).

Continuous operation may be provided by allowing the anode 12a to be spliced to a subsequent anode 12b, for example, by interengaging features or a splice insert 54 forming a splice. For example, the splice insert 54 may be a plug that fits tightly within a tubular center passage of the adjacent and aligned anodes 12a and 12b. In this way when anode 12a is completely consumed, there is no interruption in operation because it is closely followed by anode 12b. In this technique, 100% of the anode 12 may be consumed in contrast to the example in the embodiment of FIG. 1. In addition, no interruption in service is required to replace the anode 12. The lower end of the anode 12a may centered by a bearing block 53.

Figure 5:
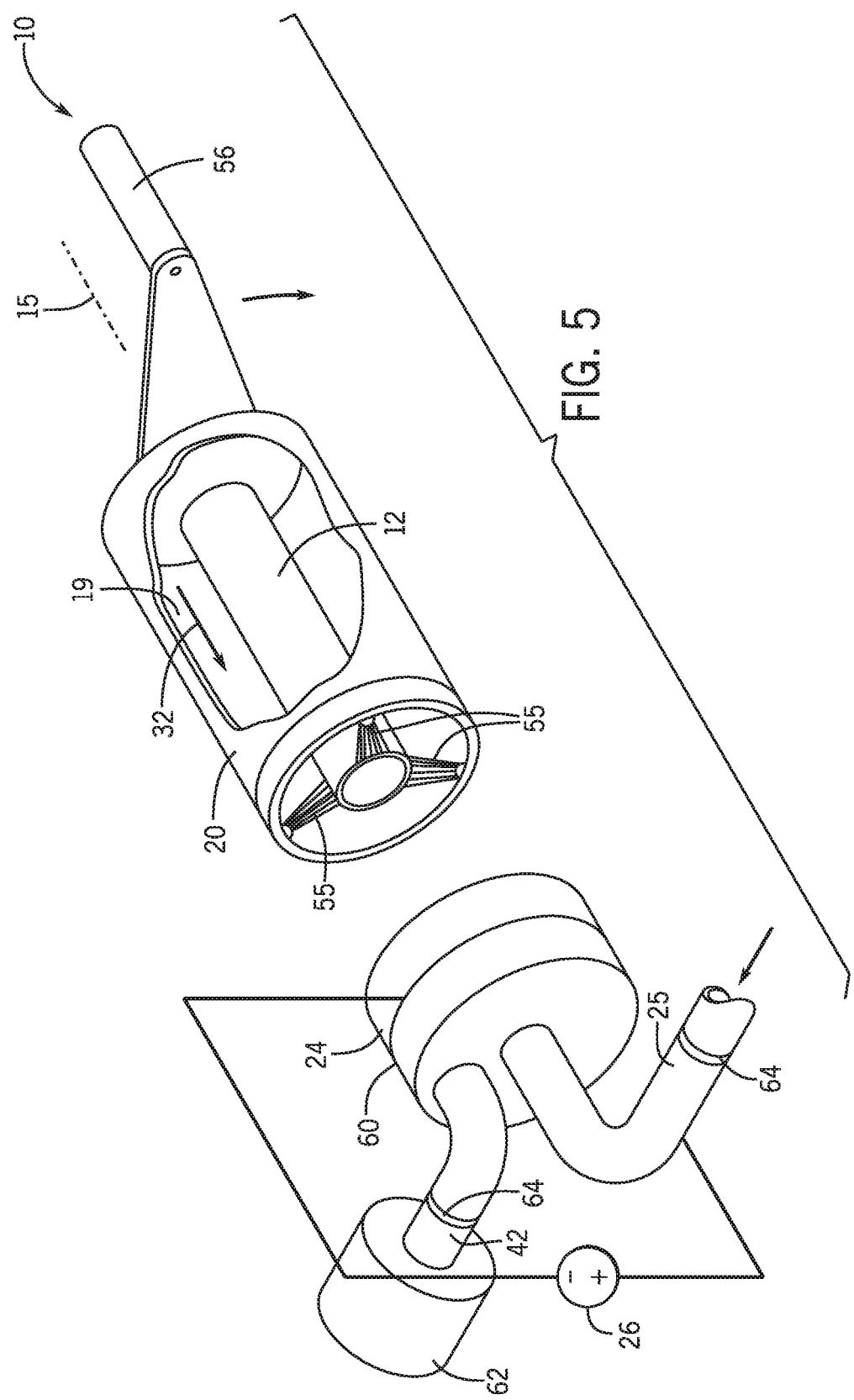
FIG. 5 is a variation on the embodiment of FIG. 3 showing a fully contained anode with a hand cranked rotation for home use.

Referring now to FIG. 5, the structure described above with respect to FIGS. 1 and 2 may be modified to provide a small scale water filter having a cylindrical cathode 20 coaxially arranged around a cylindrical anode 12 along axis 15. The anode 12 may be fixed with respect to an inlet pipe 25 and the cathode 20 may have radially inwardly extending brushes 55 that sweep along the outer surface of the anode 12 with rotation of the cathode 20. This rotation may be, for example, by handcrank 56. The end of the cathode 20 attached to the handle 56 may be otherwise closed so that water entering into the inlet pipe 25 passes along the length of the interior of the anode 12 to exit at the far end and to circulate back in the gap 19 between the outer surface of the anode 12 in the inner surface of the cathode 20. The cathode 20 may fit rotatably and sealingly within an end cap 60 that provides a path of water exit through pipe 42, for example, through a filter 62.

The power supply 26 may be attached to a conductive portion of the inlet pipe 25 to connect with the anode 12, and a brush system may be used to provide an effective slip ring 24 communicating with the rotating cathode 20. Insulative pipe stops 64 may be provided to isolate this power from the rest of the plumbing.

Figure 6:
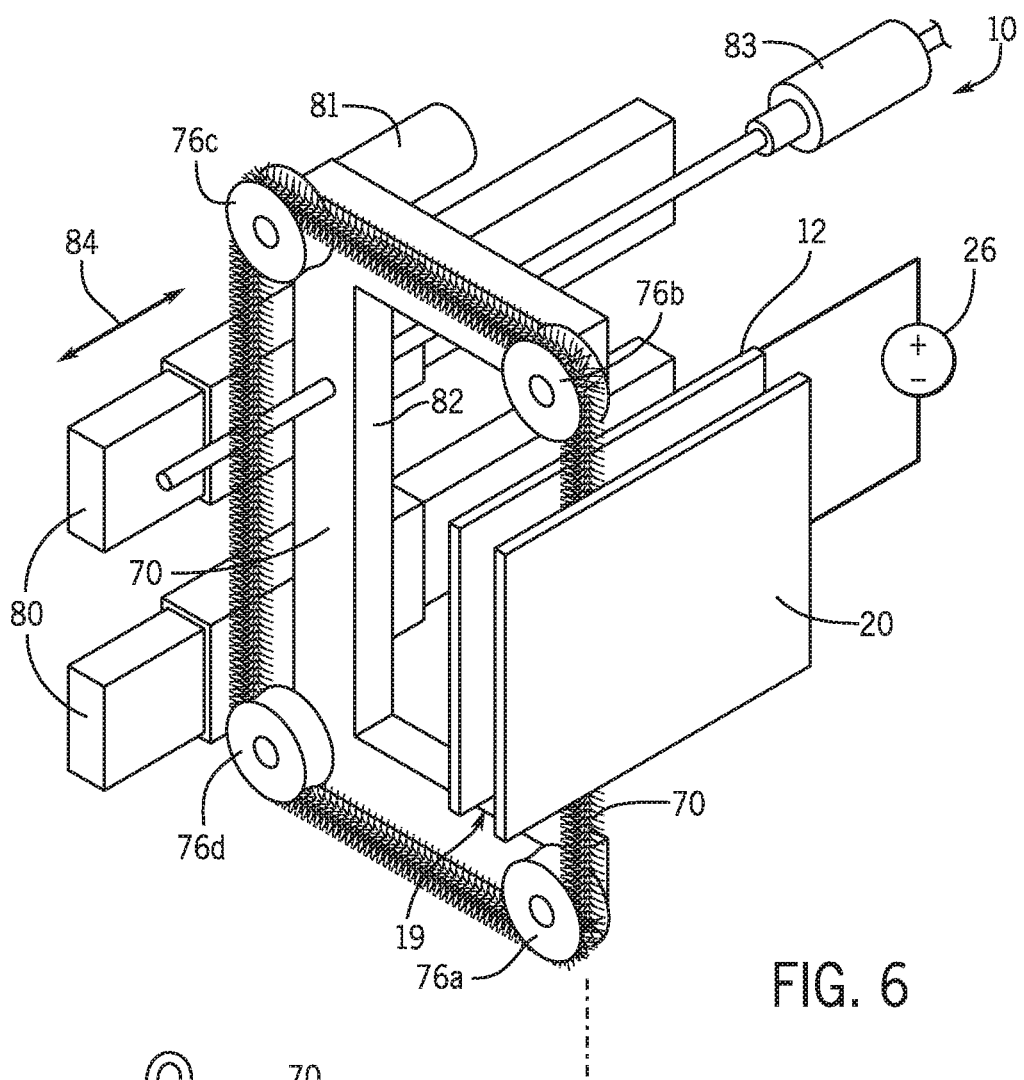
FIG. 6 is a simplified perspective view of a stationary plate system having a movable strip cleaning system for cleaning the gaps between plates.
Figure 7:
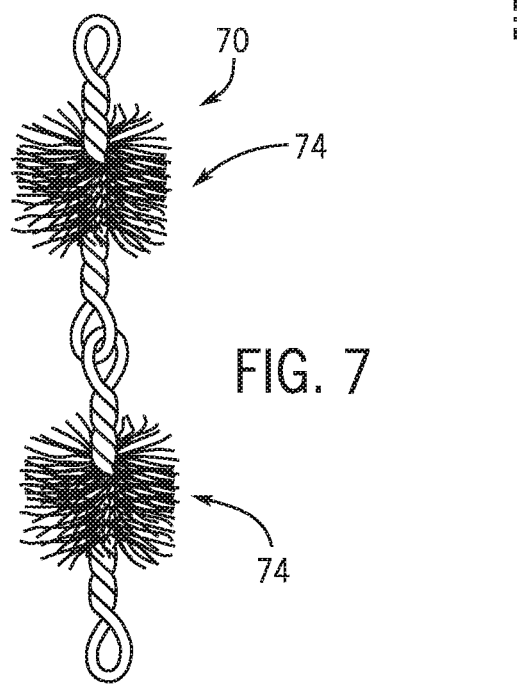
FIG. 7 is a fragmentary partial view of a strip of FIG. 5 usable in the system of FIG. 5 composed of interlocking brushes.

Referring now to FIG. 6, a cleaning system may also be provided for stationary planar anode 12 and cathode 20 having a gap 19 therebetween through the use of a cleaning strip 70 that may pass along a first axis 72 within the gap 19 between the cathode 20 and the anode 12. Referring also to FIG. 7, the cleaning strip 70 may, in one embodiment, be a set of bristle brushes 74 linked together in a chain and having a width sufficient to fully span the gap 19 and thus clean the opposed inner surfaces of the cathode 20 and anode 12 as it passes along axis 72.

Movement of the strip 70 may be provided, for example, by guiding the strip 70 through the gap 19 by pulleys 76a and 76 outside of the anode 12 and cathode 20 along the axis 72. The strip 70 may then be circulated in a continuous loop using additional pulleys 76c and 76 driven, for example, by a motor 81. More specifically, a C-arm 82 may support each of the pulleys 76 in a generally rectangular loop with the anode 12 and cathode 20 positioned along the open arms of the C-arm 82. Alternatively, single use, non-looping strip 70 may be employed drawn from a canister and delivered in spent form to a hopper (neither shown).

Movement of the strip 70 along axis 72 provides a limited cleaning of the anode 12 and cathode 20 along the line covered by the strip 70. This cleaning area may be expanded to the entire area of the opposed surfaces of anode 12 and cathode 20 by a track 80 holding the C-arm 82. Track 80 allows a longitudinal motion 84 of the C-arm 82 perpendicular to axis 15 driven by lead screw motor 83 so that a full width of the anode 12 and cathode 20 may be cleaned.

Upon completion of a cleaning of the opposed surfaces of the anode 12 and cathode 20, the direction of movement of the C-arm 82 may be reversed so that a continual cleaning of the anode 12 and cathode 20 may be provided.

Figure 8:
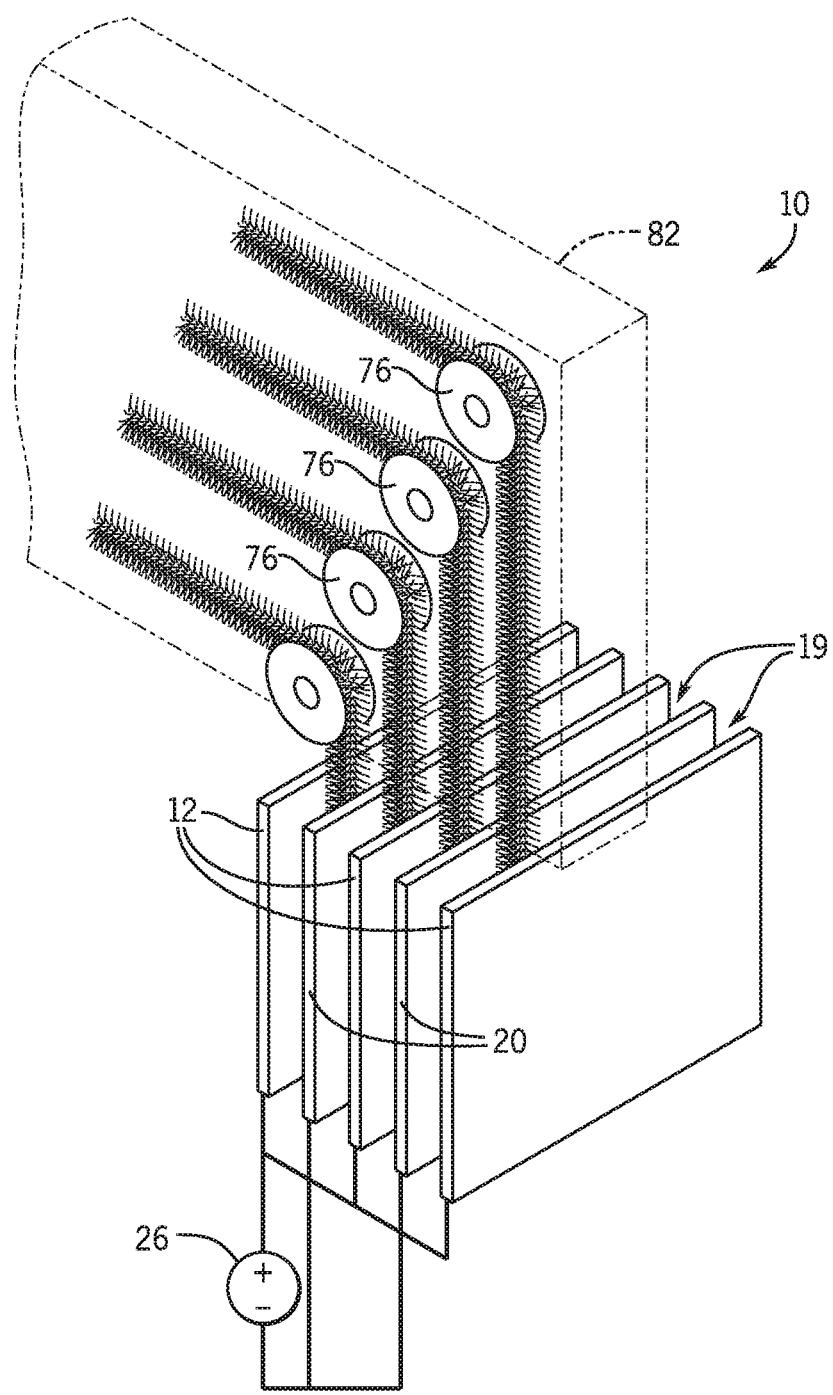
FIG. 8 is a simplified schematic of the system of FIG. 6 used with multiple plates.

Referring now to FIG. 8, will be appreciated that the system of FIG. 6 may be adapted for the use of a large number of interleaved cathodes 20 and anodes 12 arranged with corresponding gaps 19 in a stack to provide high volumetric density anode 12 and cathode 20 surfaces. The opposed surfaces of the anodes 12 and cathodes 20 may be cleaned simultaneously by the use of multiple pulleys 76 arranged in staggered configuration on the C-arm arm 82 providing the benefit of small gap dimensions in the separation between the anodes 12 and cathodes 20 and good cleaning.

Figure 9:
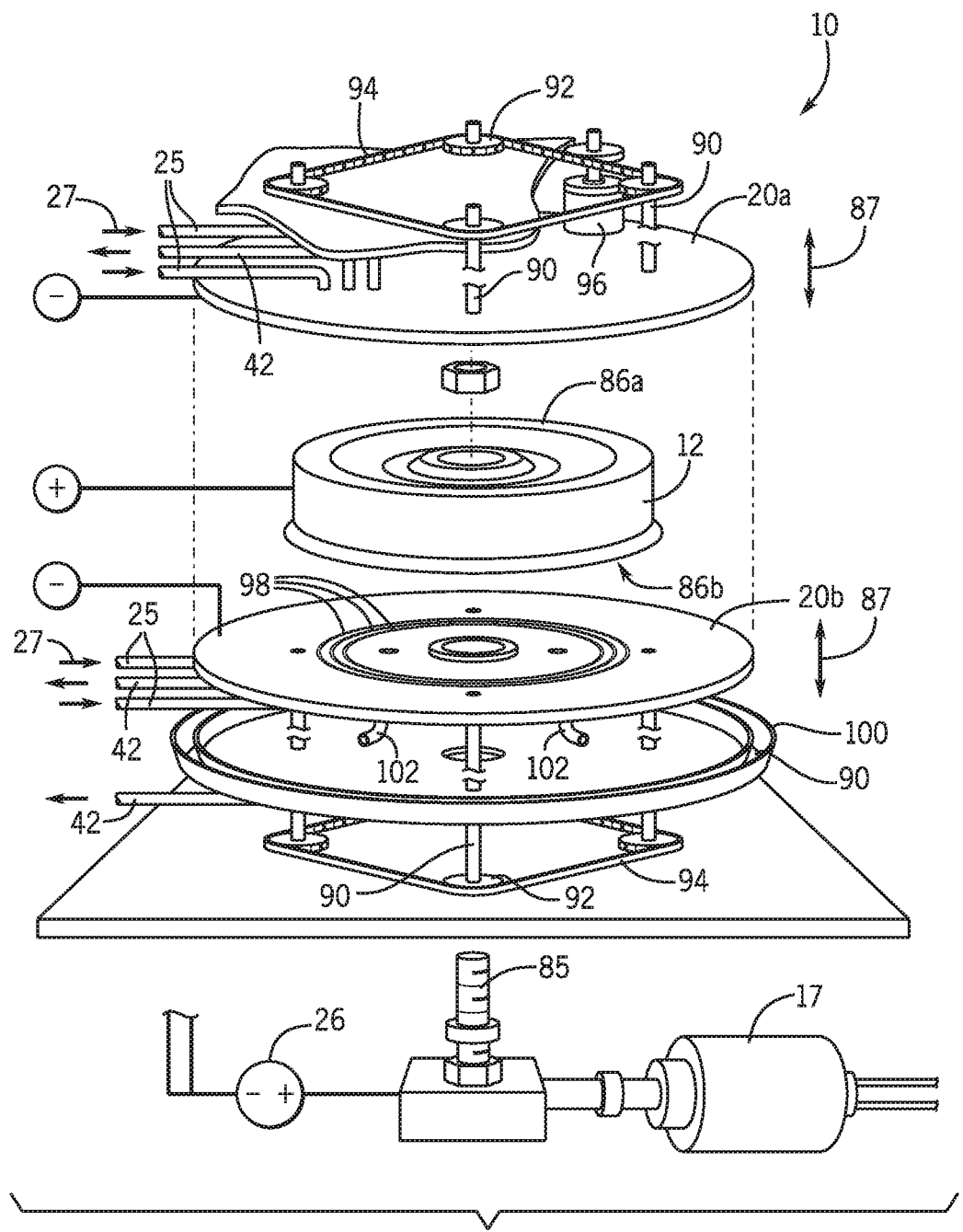
FIG. 9 is an exploded perspective view of an embodiment of the invention providing for a high mass, wheel-shaped anode to accommodate anode erosion.
Figure 10:
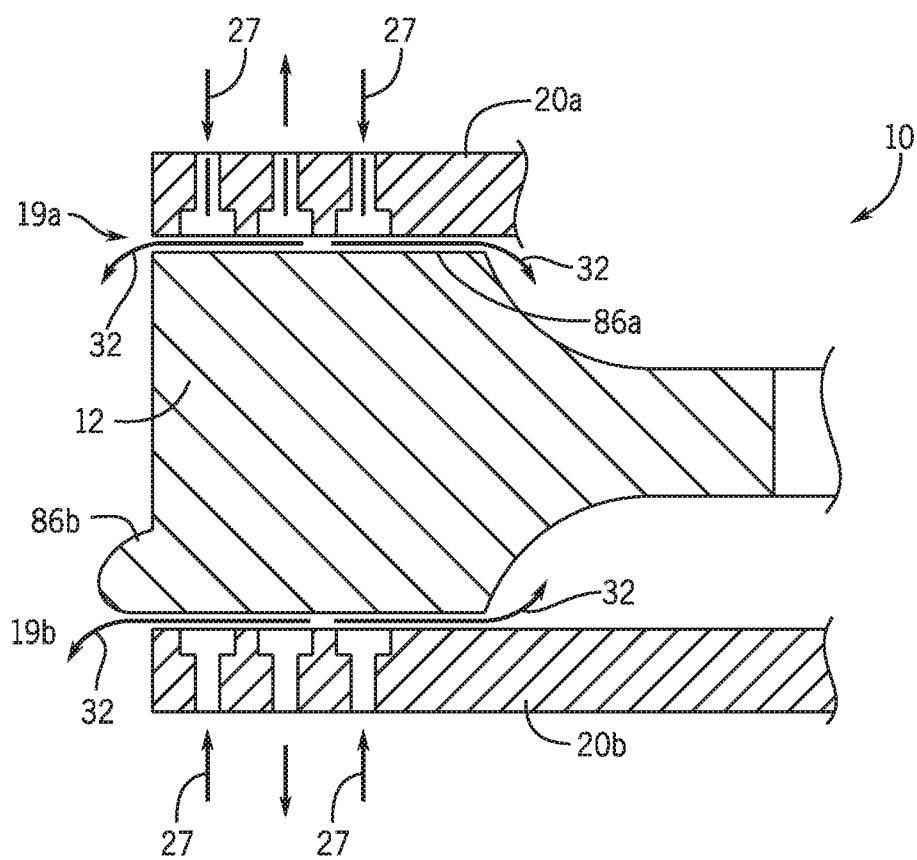
FIG. 10 is a fragmentary, elevational cross-section through the anode and cathodes of FIG. 9, when assembled, showing the water path in the gap between the three.

Referring now to FIGS. 9 and 10, erosion of the anode 12 may be mitigated through the use of a high-mass wheel shaped anode 12, for example, making use of a recycled locomotive wheel, and having circular, parallel, and substantially planar upper sidewall 86a and lower sidewall 86b. This anode 12 may be supported, for example, by thrust bearings (not shown) and rotated by means of a vertically extending rotating shaft 84 driven by motor 17. This rotation provides a more even erosion of the sidewalls 86 of the anode 12 as will be understood from the following discussion.

As depicted, the anode 12 may be flanked by upper cathode plate 20a and lower cathode plate 20b each having a planar surface sized to be positioned adjacent to one of the upper sidewall 86a and lower sidewall 86b, respectively, across gaps 19a and 19b. Each of these cathode plates 20 may be mounted for vertical movement with respect to the anode 12 as indicated by arrows 87 to hold constant gaps 19 with gradual wear of the anode 12 on sidewalls 86. This motion indicated by arrows 87 may be, for example, provided by a set of threaded rods 90 suspending the cathode plates 20 with respect to stationary structure on sprocketed nuts 92. These nuts 92 may be turned by a common belt 94 driven by a motor 96 to raise and lower the plates 20 respectively. The motor 96, for example, may be driven using feedback control to adjust the plate separation across the gaps 19 according to current flow or the like so that the gaps 19 are automatically controlled.

Each of the upper and lower cathode plates 20 may present on their surfaces facing the anode 12, a set of three concentric circular grooves 98 position to be opposite respective sidewalls 86. The exterior of these three grooves 98 may connect to inlet pipes 25 to receive water 27 to be treated, while the center groove may connect to an outlet pipe 42 conducting treated water 47. Treated water 47 may also be collected from waterflow 32 passing radially outward from the sidewalls 86, as shown in FIG. 10, such as may be collected by a concentric lower trough 100 positioned just straddling the outer perimeter of the circular cathode plates 20 and from collection pipes 102 receiving water passing radially inward from the sidewalls 86.

In other respects, this design may make use of the elements discussed above respect to the other embodiments.

Additional features and details related to the construction of the electrolysis system are found in US patent applications 2011/0079520 and 2011/0108438 incorporated by reference.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claim is:

1. A water treating apparatus comprising:
    a cathodic electrode providing a first planar exposed electrode face;
    an anodic electrode providing a second planar exposed electrode face, the second exposed electrode face presenting a portion proximate to the first exposed electrode face across a gap;
    a water conduit for introducing water to be treated into the gap;
    a cleaning strip movable along a strip axis within the gap to provide a mechanical abrasion between the cleaning strip and at least one of the first planar exposed electrode face and second planar exposed electrode face with movement of the cleaning strip along the strip axis; and
    cleaning strip support guides positioned to receive the cleaning strip flanking the first and second exposed electrode faces and to move the cleaning strip perpendicularly to the strip axis to provide cleaning over an area of the first and second exposed electrode faces in the gap.

2. The water treatment apparatus of claim 1 wherein the cleaning strip is sized to contact both the first and second electrode exposed surfaces.

3. The water treatment apparatus of claim 2 wherein the cleaning strip provides for radially extending bristles.

4. The water treatment apparatus of claim 1 wherein the gap width is greater than 0.5 millimeters and less than 25 millimeters.

5. The water treatment apparatus of claim 1 wherein further including an electrical power supply connected between the anodic electrode and cathodic electrode.

* * * * *